J. E. HAGSTROM.
FILTER PRESS PLATE.
APPLICATION FILED JAN. 26, 1918.
1,282,414.
Patented Oct. 22, 1918.
2 SHEETS—SHEET 1.
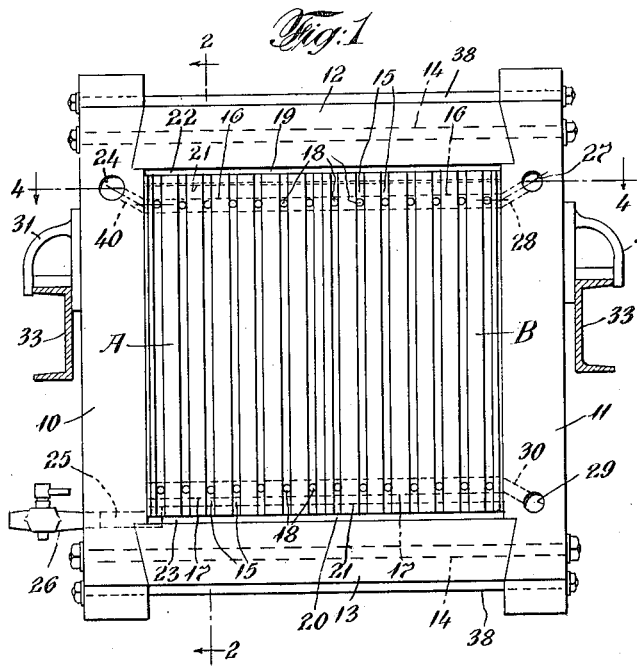
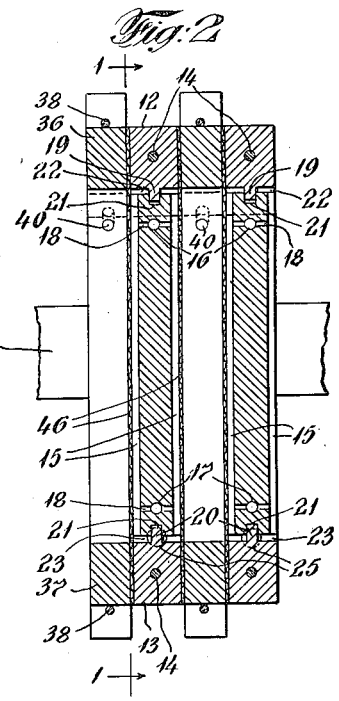
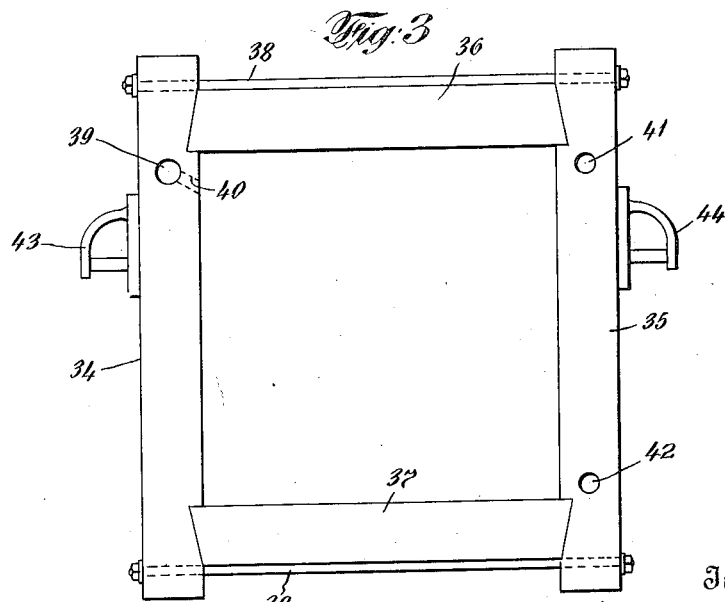
Inventor
Joel E. Hagstrom
By his Attorney J. E. HAGSTROM.
FILTER PRESS PLATE.
APPLICATION FILED JAN. 26, 1918.
1,282,414.
Patented Oct. 22, 1918.
2 SHEETS—SHEET 2.
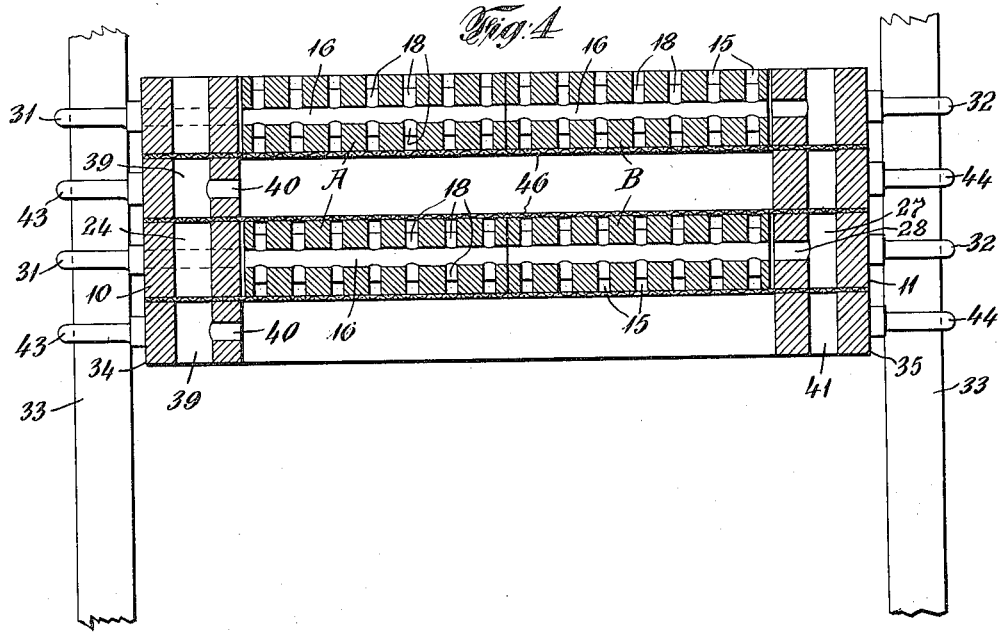
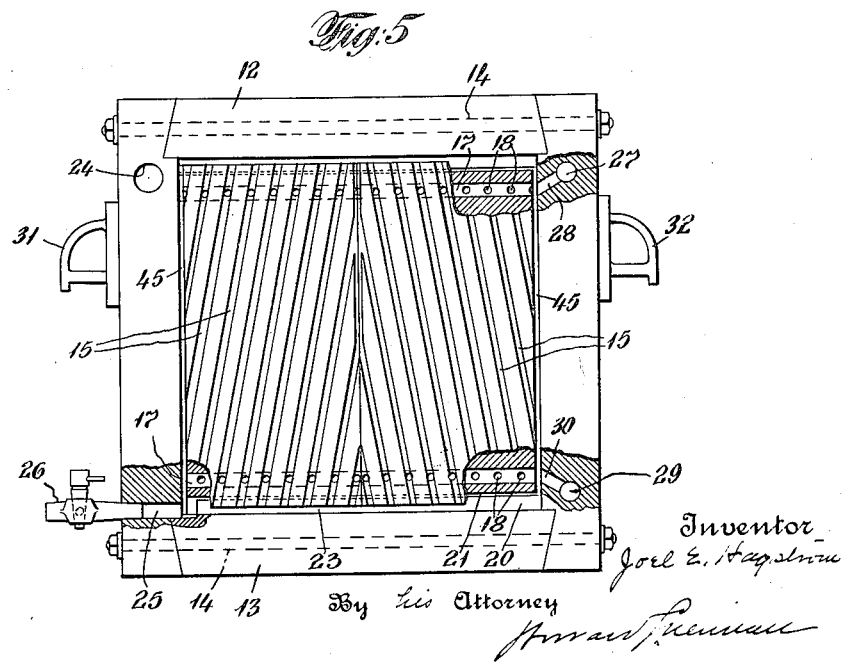
Inventor
Joel E. Hagstrom
By his Attorney

UNITED STATES PATENT OFFICE.

JOEL E. HAGSTROM, OF BROOKLYN, NEW YORK, ASSIGNOR TO THE INDEPENDENT FILTER PRESS CO., INC., OF NEW YORK, N. Y., A CORPORATION OF NEW YORK.

FILTER-PRESS PLATE.

1,282,414.  Specification of Letters Patent.  Patented Oct. 22, 1918.

Application filed January 26, 1918. Serial No. 213,880.

*To all whom it may concern:*

Be it known that I, JOEL E. HAGSTROM, a citizen of the United States, residing in the city of Brooklyn, county of Kings, and State of New York, have invented certain new and useful Improvements in Filter-Press Plates, of which the following is a full, clear, and exact specification.

My invention relates to filter press parts and refers particularly to filter press plates.

One object of my invention is a filter press plate which will not warp or twist during the various operations to which it is subjected during its use.

Another object of my invention is a filter press plate, the parts of which may be readily replaced without the abandonment of the entire plate.

Another object of my invention is a filter press plate by means of which filtered material may be readily and effectively washed.

Another object of my invention is a filter press plate, strong in construction, effective in operation and economical in manufacture.

These and other objects of my invention will be evident upon a consideration of my specification, drawings and claims.

Filter plates for use in the ordinary form of filter press must be comprised of an outside frame structure, in order to make a tight joint with adjacent filter-press frames; each side of the plate must carry an interior grooved portion, or field, to allow of the passage of wash water therethrough, and must be extremely strong and free from liability to warp and twist under repeated treatment with solutions and frequent drying.

The ordinary wooden filter plate is composed of a series of parallel pieces of wood, clamped together vertically by bolts, each piece having corresponding sections of the frame work and the grooved field, so that when fitted and clamped together, they will compose a rigid and compact whole. The filter plate, as thus formed, comprises a series of adjacent wooden members, the grain of all of which is parallel, clamped by a series of iron bars. A filter plate of this construction is liable to warp as it possesses no means whereby an expansion or contraction of any portion may be counteracted, and hence, the entire structure is twisted out of its original shape and made useless for filtering purposes.

The filter plate of my invention overcomes all of these objections. It is formed of a series of movable parts so arranged as not to be injuriously affected by the swelling incident to the absorption of a liquid, and so connected as to readily and economically allow of the replacement of its parts without loss of the entire plate. It further possesses new and improved means for the more thorough washing of material within the press.

Instead of being composed of a series of parts, each being a portion of both the frame part and the grooved field, firmly clamped together, it comprises a rigid frame part which carries a loose and movable grooved field, capable of contraction and expansion without affecting the frame portion. In my device, therefore, the central grooved field may expand or contract, without causing a pressure upon the frame portion, and reversely, the frame portion may expand, or contract, without causing a pressure upon the central grooved field, thus preventing the warping of the plates incident to the older devices.

Further, if for any reason either of the parts of the filter plate should become useless, it may be readily replaced without the destruction of the useful part.

In the accompanying drawings, illustrating modifications of the device of my invention, similar parts are designated by similar numerals.

Figure 1 is a view along the line 1—1 of Fig. 2 in the direction of the arrows.

Fig. 2 is a cross-section through the line 2—2 of Fig. 1.

Fig. 3 is a side plan view of a filter press frame adapted to be used with the filter press plate of my invention.

Fig. 4 is a cross-section through the line 4—4 of Fig. 1.

Fig. 5 is a side plan view, partly in cross-section, of a modification of the device of my invention.

The frame portion of the filter plate illustrated, comprises the side members 10 and 11, tongued and grooved to the top member 12 and the bottom member 13 as shown, and further clamped together by the stay rods 14, 14. The field comprises two similar members, A and B, each carrying a series of vertically parallel grooves 15, 15, on each face thereof. Extending through the fields A and B are an upper conduit 16 and a lower conduit 17. A series of conduits 18, 18 extends outwardly from the conduits 16 and 17 through the members A and B, terminating in each groove 15, 15 on both of the faces thereof. The top member 12 of the frame has a tongue extension 19, and the bottom member 13 has a tongue extension 20, both fitting into recesses 21, 21 of the field members A and B to maintain them in position. A top channel 22 and a bottom channel 23 exist between the field members A and B and the frame top 12 and the frame bottom 13. The size of the field members A and B is such as to allow them, in their dry condition, to have some play within the frame 10, 11, 12, 13, the expansion due to the absorption of a liquid not being sufficient to cause them to twist or warp, due to their abutment upon the frame. The side 10 contains a conduit 24 extending therethrough, and a conduit 25 extending therethrough and inwardly toward the field member A, and carrying the faucet 26. The side 11 contains an upper conduit 27 connected to the inward face of the side by the conduit 28 in alinement with the conduit 16 of the field member B, and a lower conduit 29 connected to the inward face of the side by the conduit 30 in alinement with the conduit 17 of the field member B. The side members 10 and 11 carry the extended arms 31 and 32 for supporting the plate upon the side members 33, 33 of the filter press body.

The filter frame shown in Fig. 3 and which is suitable for use with my filter plate, comprises the sides 34, 35, the top 36, and the bottom 37, grooved together and clamped by the stay rods 38, 38. The side 34 has the conduit 39 extending therethrough in alinement with the conduit 24 of my plate and connected to the inner face of the side 34 by the conduit 40. The side 35 contains the conduit 41 in alinement with the conduit 27 of my plate, and the conduit 42 in alinement with the conduit 29 of my plate. The sides 34 and 35 carry the extended arms 43, and 44 for supporting the frame upon the side members 33, 33 of the filter press body.

The modification of the filter plate, shown in Fig. 5, is similar to that shown in the other drawings, with the exception that the grooves 15, 15 are not vertical but diverge at an angle from the top and bottom members, and channels 45, 45 are situated on the inward sides of the side members 10 and 11, to allow liquid passing through the grooves 15, 15 to flow downwardly to the channel 23.

It is evident that by this construction, the grain of wood used in the frame portion 10, 11, 12, 13 need not be parallel with the grain of wood used in the field A B, thus materially strengthening the device, and that the possible movement between the frame and field will allow of expansion and contraction without warping or twisting of the device. It is further evident that by having the series of conduits 16, 16 and 18, 18 extend the entire width of the field that a more thorough washing must result than when they extend for only a portion thereof.

The operation of my filter plate with filter frames is as follows:—

Filter cloth 46 is placed around a series of filter plates, and the filter plates and filter frames are compressed in the usual manner in alternate arrangement. The material to be filtered is then forced under pressure through the feed conduit 39, 24, the material forming a solid cake between the plates and the liquid passing through the filter cloth 46, the grooves 15, 15 and thence outwardly. When it is desired to wash the filter cake, the flow of material is interrupted and the wash liquid forced through the conduits 41, 27 and 42 and 29. The liquid then passes through the series of conduits 28, 28, 30, 30 into the series of conduits 16, 17 and thence outwardly through the conduits 18, 18 and through the filter cake, the liquid further passing downwardly through the grooves 15, 15 and outwardly through the faucet 26.

I do not limit myself to the particular size, shape, number or arrangement of parts as shown and described, all of which may be varied without going beyond the scope of my invention as described and claimed.

What I claim is:—

1. In a filter press plate, in combination, a rigid frame, a grooved field and means for carrying the field within the frame and movable therein.

2. In a filter press plate, in combination, a rigid frame, a grooved field, means for movably carrying the field within the frame, a series of conduits within the field and a series of conduits connecting the inner conduits with the exterior faces of the field.

3. In a filter press plate, in combination, a rigid frame, a grooved field, means for movably carrying the field within the frame, a series of conduits within the field, a series of conduits extending outwardly through the field connected with the inner series of conduits and a series of conduits within the frame in alinement with the series of inner conduits of the field.

4. In a filter press plate, in combination, a rigid frame, a grooved field, means for movably carrying the field within the frame, a series of grooves upon the exterior faces of the field, a series of conduits within the field, a series of conduits connecting the inner conduits with the grooves, a series of conduits within the frame in alinement with the inner conduits of the field, and means whereby a liquid may be removed from the field after passage therethrough.

5. In a filter press plate, in combination, a rigid frame, a grooved field, means for movably carrying the field within the frame, a series of parallel grooves upon the exterior faces of the field, a series of conduits within the field and extending therethrough, a series of conduits connecting the inner conduits with grooves extending across the faces of the field, a series of conduits within the frame in alinement with the inner series of conduits and conduits for removing a liquid from the field and frame after it has passed therethrough.

Signed at New York city, in the county of New York and State of New York, this 25th day of January, 1918.

JOEL E. HAGSTROM.